United States Patent
Hoover et al.

(10) Patent No.: US 8,024,935 B2
(45) Date of Patent: Sep. 27, 2011

(54) FLUSH INLET SCOOP DESIGN FOR AIRCRAFT BLEED AIR SYSTEM

(75) Inventors: Robert Hoover, Phoenix, AZ (US); Morris Anderson, Mesa, AZ (US); Robert Romano, Tempe, AZ (US); Jeff Mendoza, Manchester, CT (US); Dan Judd, Phoenix, AZ (US); Don Weir, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 496 days.

(21) Appl. No.: 12/275,990

(22) Filed: Nov. 21, 2008

(65) Prior Publication Data
US 2010/0126182 A1    May 27, 2010

(51) Int. Cl.
*F02C 6/04* (2006.01)
(52) U.S. Cl. ............... 60/785; 60/795; 60/226.1
(58) Field of Classification Search ............... 60/226.1, 60/262, 266, 728, 785, 795; 415/119; 181/213–216, 181/219; 244/53 B, 54, 134 R
See application file for complete search history.

(56) References Cited

U.S. PATENT DOCUMENTS

| 3,592,291 | A | 7/1971 | Medawar |
| 7,607,308 | B2 * | 10/2009 | Kraft et al. ............... 60/785 |
| 2007/0245739 | A1 * | 10/2007 | Stretton et al. ............ 60/728 |
| 2008/0128557 | A1 | 6/2008 | Acheson et al. |
| 2008/0179466 | A1 * | 7/2008 | Campbell et al. ........... 244/53 B |
| 2008/0230651 | A1 * | 9/2008 | Porte ..................... 244/118.5 |

FOREIGN PATENT DOCUMENTS

GB    2444632 A    11/2008

* cited by examiner

*Primary Examiner* — Louis Casaregola
*Assistant Examiner* — Phutthiwat Wongwian
(74) *Attorney, Agent, or Firm* — Ingrassia Fisher & Lorenz, P.C.

(57) ABSTRACT

A bleed air duct that preferably includes an inlet section configured to include a flush scoop and a louver. The louver is located and configured such that in the desired operating flow range of the duct, the fluid entering the flush scoop is disturbed and as a result creates a low pressure region downstream of the louver. The low pressure region substantially eliminates the generation of any pressure pulses and acoustic resonance also known as Helmholtz resonance.

20 Claims, 4 Drawing Sheets

FLUSH INLET SCOOP DESIGN FOR AIRCRAFT BLEED AIR SYSTEM

TECHNICAL FIELD

The present invention relates to bleed air duct systems and, more particularly, to an inlet of the duct system, configured to minimize tonal resonance in the duct system.

BACKGROUND

A gas turbine engine may be used to supply power to various types of vehicles and systems. For example, gas turbine engines may be used to supply propulsion power to an aircraft. Many gas turbine engines include at least three major sections, a compressor section, a combustor section, and a turbine section. The compressor section receives a flow of intake air and raises the pressure of this air to a relatively high level. In a multi-spool (e.g., multi-shaft) engine, the compressor section may include two or more compressors. The compressed air from the compressor section then enters the combustor section, where a ring of fuel nozzles injects a steady stream of fuel. The injected fuel is ignited by a burner, which significantly increases the energy of the compressed air.

The high-energy compressed air from the combustor section then flows into and through the turbine section, causing rotationally mounted turbine blades to rotate and generate energy. The air exiting the turbine section is then exhausted from the engine. Similar to the compressor section, in a multi-spool engine the turbine section may include a plurality of turbines. The energy generated in each of the turbines may be used to power other portions of the engine.

In addition to providing propulsion power, a gas turbine engine may also, or instead, be used to supply either, or both, electrical and pneumatic power to the aircraft. For example, some gas turbine engines include a bleed air port between the compressor section and the turbine section. The bleed air port allows some of the compressed air from the compressor section to be diverted away from the turbine section via a bypass duct, and used for other functions such as, for example, the aircraft environmental control system, the cabin pressure control system, and/or the aircraft thermal anti-ice (TAI) system.

Recent aircraft bleed air system designs require cooling of the high pressure bleed air. Accordingly, flush inlet scoops are often used to minimize fan duct losses and to maintain high volumetric flow rates through the bleed air duct system, thereby cooling the high pressure bleed air. Depending on the cooling requirements, the airflow through the fan bleed air duct system varies. Problems may occur when the fan bleed flow requirements are zero, and the control system closes the valve for the fan bleed air duct system. When the valve is in a closed position, a resonance chamber is formed from which a Helmholtz resonance may be created, powered by airflow over the flush scoop. The occurrence of the resonance may increase the noise signature of the engine significantly, and may cause the vibration levels of the engine system to increase above the set limits of the installation. This in turn can adversely impact overall operational efficiency and costs.

Hence, there is a need for a system for reducing resonance occurrences in bleed air ducts that, as compared to present systems, exhibits reduced noise signatures in the engine during normal bleed air operations, does not adversely impact gas turbine engine efficiency, and/or does not adversely impact overall operational efficiency and cost. The present invention addresses one or more of these needs.

BRIEF SUMMARY

The present invention provides a flush inlet scoop duct for reduction of Helmholtz resonances in an aircraft bleed air system.

In one particular embodiment, and by way of example only, there is provided a flush inlet scoop duct for a bleed air system. The flush inlet scoop duct including a duct having a wall that defines a flow passageway and at least a flush scoop in fluid communication with the flow passageway. The flush scoop is adapted to receive a flow of fluid from a local flow stream of fluid. The flush inlet scoop duct further including a louver coupled to the flush scoop. The louver extends into the flow of fluid received from the local flow stream of fluid and is configured to create a low pressure region within the flow passageway, downstream of the louver.

In another embodiment, and by way of example only, there is provided a bleed air duct system for a vehicle engine including a flush inlet scoop. The bleed air duct system includes a fan bleed air duct having a wall that defines a flow passageway. The fan bleed air duct is adapted to receive a flow of fluid from the vehicle engine. The system further includes an outer fan bleed air duct having a wall that defines a flow passageway, and including at least a flush scoop in fluid communication with the flow passageway. The flush scoop is adapted to receive a flow of fluid from the fan bleed air duct. A louver is coupled to the flush scoop and extends into the flow of fluid received from the fan bleed air duct. The louver is configured to create a low pressure region within the flow passageway, downstream of the louver.

In yet another exemplary embodiment, and by way of example only, there is provided a turbine bleed air duct system. The turbine bleed air duct system includes a gas turbine engine including an engine case, an intake section, a compressor section and a turbine section all mounted in flow series within and engine case. The system further includes a fan bleed air duct having a wall that defines a flow passageway, the fan bleed air duct adapted to receive a flow of fluid from the intake section. An outer fan bleed air duct having a wall that defines a flow passageway, and including at least a flush scoop is in fluid communication with the flow passageway. The flush scoop includes an inlet section and a scoop throat. The inlet section is defined by a forward portion and a highlite. The flush scoop is adapted to receive a flow of fluid from the fan bleed air duct. A louver is coupled to the flush scoop and extends into the flow of fluid received from the fan bleed air duct. The louver is configured to create a low pressure region within the flow passageway, downstream of the louver.

Other independent features and advantages of the preferred a flush scoop inlet design for the reduction of Helmholtz resonances in an aircraft bleed air system will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figure, wherein.

DETAILED DESCRIPTION

Before proceeding with the description, it is to be appreciated that the following detailed description is merely exemplary in nature and is not intended to limit the invention or the application and uses of the invention. Furthermore, there is no intention to be bound by any theory presented in the preceding background or the following detailed description.

The embodiment disclosed herein is described in sufficient detail to enable those skilled in the art to practice the invention, and it is to be understood that other embodiments may be utilized and that logical mechanical changes may be made without departing from the scope of the present invention. Furthermore, it will be understood by one of skilled in the art that although the specific embodiment illustrated below is depicted and described as being implemented in an aircraft gas turbine engine bleed air system, it will be appreciated that it can be implemented in various other systems and environments, and can be used in any one of numerous applications of fluid flow in a duct, pipe or tube where it may be desirable to minimize fluid losses while maintaining high volumetric flow rates through the flow system without the formation of a resonance chamber and an increase in device noise and vibration levels. The following detailed description is, therefore, not to be taken in a limiting sense.

Figure 1:
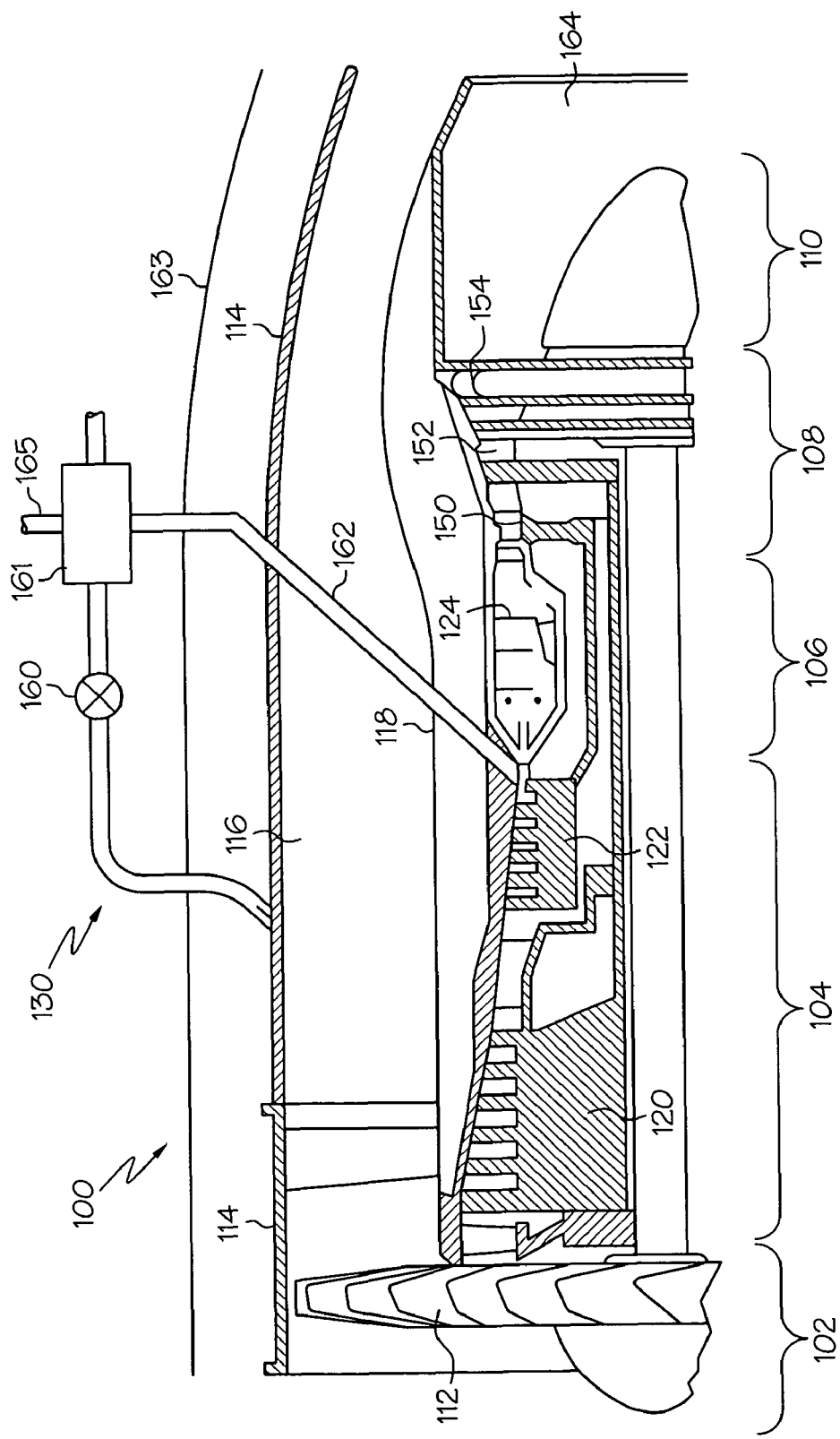
FIG. 1 is a simplified representation of a gas turbine engine that may be used to supply bleed air flow to one or more ducts.

Turning now to the description and with reference first to FIG. 1, a simplified representation of a gas turbine engine that may be used to supply bleed air is shown. The gas turbine engine 100 includes an intake section 102, a compressor section 104, a combustion section 106, a turbine section 108, and an exhaust section 110. In FIG. 1, only half the structure is shown, it being substantially rotationally symmetric about a centerline and axis of rotation 101. The intake section 102 includes a fan 112, which is mounted in an engine fan case. The fan 112 draws air into the intake section 102 and accelerates it. A fraction of the accelerated air exhausted from the fan 112 is directed through a bypass duct 116 disposed between an engine outer fan duct 114 and an engine inner fan duct 118, and provides a forward thrust. The remaining fraction of air exhausted from the fan 112 is directed into the compressor section 104.

The compressor section 104 can include multiple compressor stages. FIG. 1 illustrates two compressor stages; an intermediate pressure compressor 120 and a high pressure compressor 122. The compressor section 104 raises the pressure of air directed into it via an air inlet 112. The compressed air is then directed into the combustion section 106, which includes a combustor 124 where the high pressure air is mixed with fuel and combusted. The combustor 124 receives the high pressure air from the compressor section 104 and mixes it with fuel to generate combusted air. The combusted air is then directed into the turbine section 108. The combusted air expands through the turbine section 108, causing it to rotate. In this particular example, the turbine section 108 includes three turbines disposed in axial series flow, although it should be understood that any number of turbines may be included according to design specifics. More specifically, FIG. 1 depicts a high pressure turbine 150, an intermediate pressure turbine 152, and a low pressure turbine 154. The air is then exhausted through a propulsion nozzle 164 disposed in the exhaust section 110, providing addition forward thrust. As the turbines 150, 152 and 154 rotate, each drives equipment in the gas turbine engine 100 via concentrically disposed shafts or spools as best seen in FIG. 1.

The engine core compressor section 104 can be used to provide high pressure air as a source of power for the aircraft environmental control system (ECS) 165, or as an energy source for a thermal anti-ice system on the aircraft. Often the air from the engine core compressor section 104 is at a temperature which exceeds the temperature limits set within the aircraft and needs to be cooled. This air is commonly referred to as high pressure bleed air 162. The high pressure bleed air 162 from the engine core compressor section 104 is often cooled via an air-to-air heat exchanger 161. High pressure bleed air 162 from the engine core compressor section 104 is transported through the engine inner fan duct 118 and the engine outer fan duct 114 to an air-to-air heat exchanger located outside of the engine, either between the engine outer fan duct 114 and an aircraft pylon 163, or beyond the aircraft pylon 163, within the aircraft structure.

A fan bleed air duct system 130 is disposed downstream of the intake section 102. The fan bleed air duct system 130 receives fan air from the engine outer fan duct 114. The quantity of airflow through the fan bleed air duct system 130 is controlled by a fan bleed air valve 160. The fan bleed air which passes though the fan bleed air valve 160 enters the air-to-air heat exchanger 161 which is designed to cool high pressure bleed air, for the aircraft ECS system or aircraft thermal anti-ice system. A resonance may occur when the quantity of required fan bleed air is very low, or zero. The fan bleed air duct system 130 interfaces with the aircraft pylon 163 and supplies fan bleed air from the gas turbine engine 100 to one or more other aircraft systems. During operation of the gas turbine engine 100 fan bleed air flows from the bypass duct 116, into and through the fan bleed air duct system 130 as best illustrated in FIG. 1.

Figure 2:
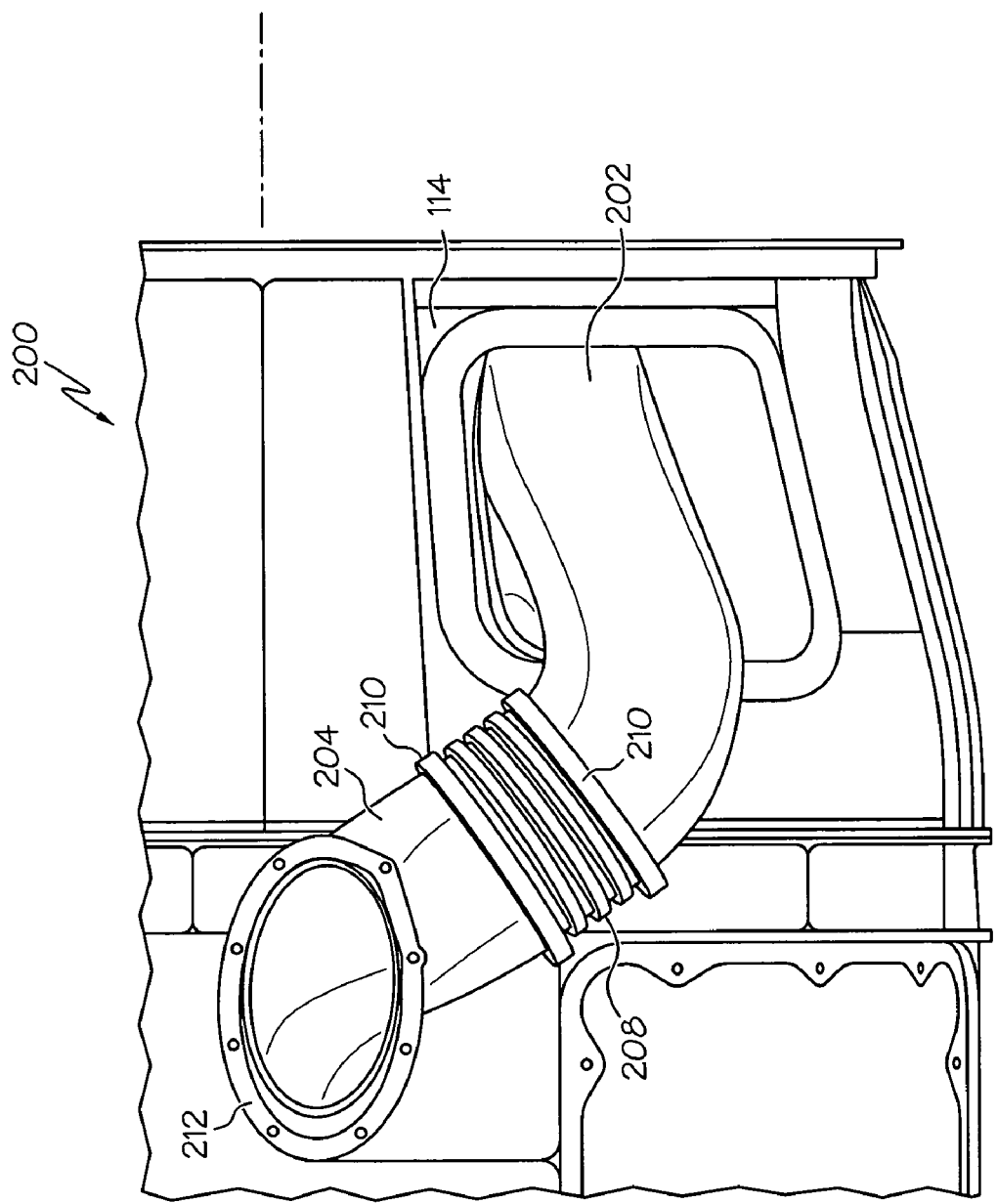
FIG. 2 is a simplified exterior view of a portion of a fan bleed air duct system that may be used with the engine shown in FIG. 1.

Referring now to FIG. 2, illustrated is an exterior view of a portion of the engine of FIG. 1. Illustrated is an outer fan bleed air duct system 200, generally similar to the fan bleed air duct system 130 of FIG. 1, shown looking radially inward toward a gas turbine engine, such as the gas turbine engine 100 of FIG. 1. The outer fan bleed air duct system 200 includes a lower fan bleed air duct 202 and an upper fan bleed air duct 204 as best illustrated in FIG. 2 that direct the bleed air to a desired end-use duct system. The lower fan bleed air duct 202 attaches to the engine outer fan duct 114 and replaces a commonly used engine access door. In this particular embodiment, the lower fan bleed air duct 202 is connected to the upper fan bleed air duct 204, via a flexible coupling 208. A plurality of band clamps 210 provide for fixation of the flexible coupling 208 to a portion of each of the upper and lower fan bleed air ducts 204, 202. The upper fan bleed air duct 204 has formed at an end a pylon interface 212 for coupling of the upper fan bleed air duct 204 to additional component parts that direct the bleed air to the desired end-use systems.

The outer fan bleed air duct system 200 is configured to create a relatively low pressure region (described presently) downstream of an inlet which relieves the periodic pressure buildup in the low pressure region when the flow is shut-off, and more particularly when the fan bleed air valve 160 (FIG. 1) is closed. During operation, the outer fan bleed air duct system 200 delivers cool air to an aircraft pre-cooler (not shown) which cools hot, high pressure air. The configuration of the lower fan bleed air duct 202, according to one particular embodiment, that provides these functions and exhibits these characteristics is partially shown in cross section in FIG. 3 and in an orthogonal view in FIG. 4, and will now be described in more detail.

Figure 3:
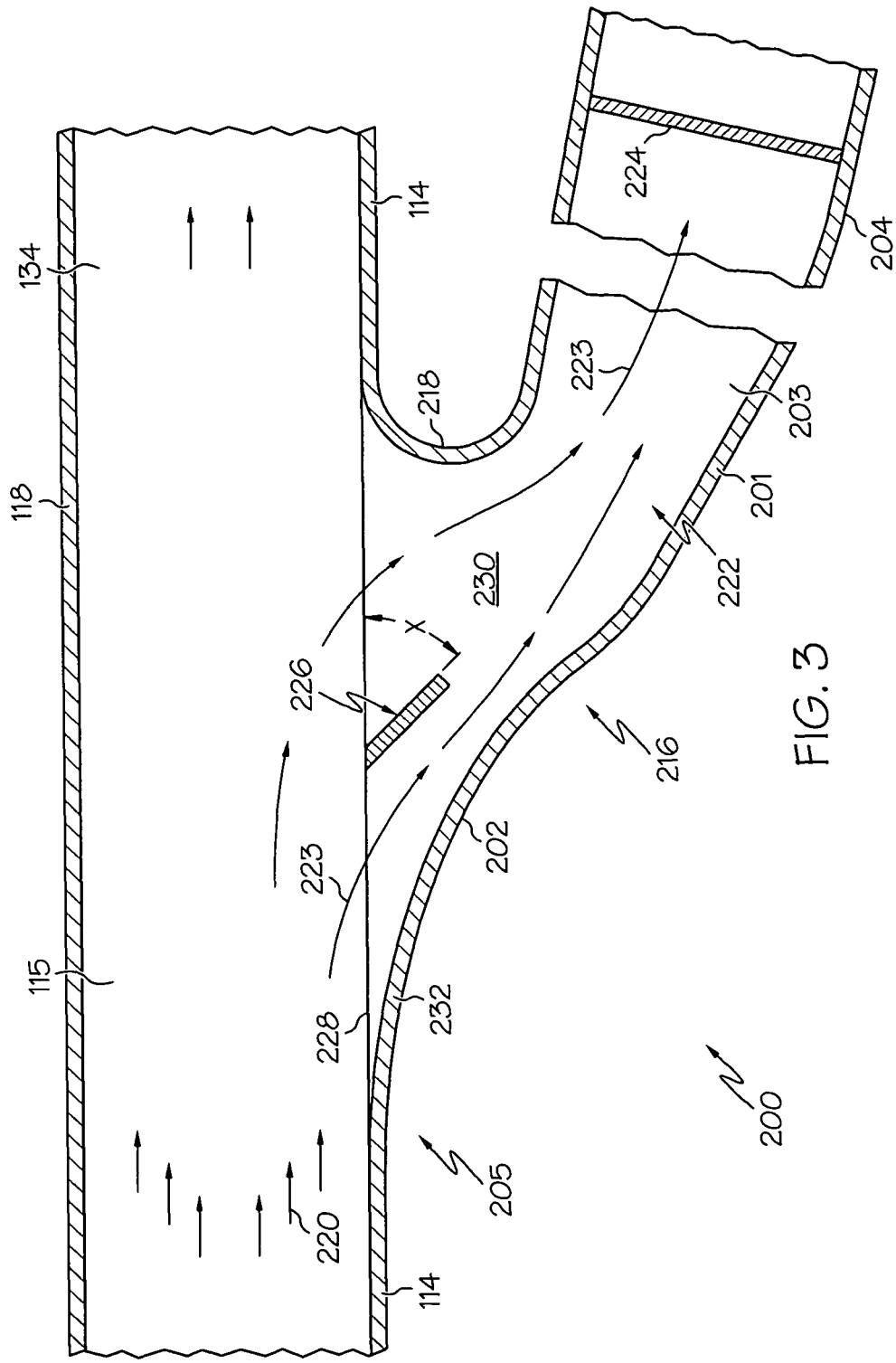
FIG. 3 is a simplified cross section of a portion of an exemplary embodiment of a flush scoop inlet bleed air duct that may be used with the engine shown in FIG. 1.
Figure 4:
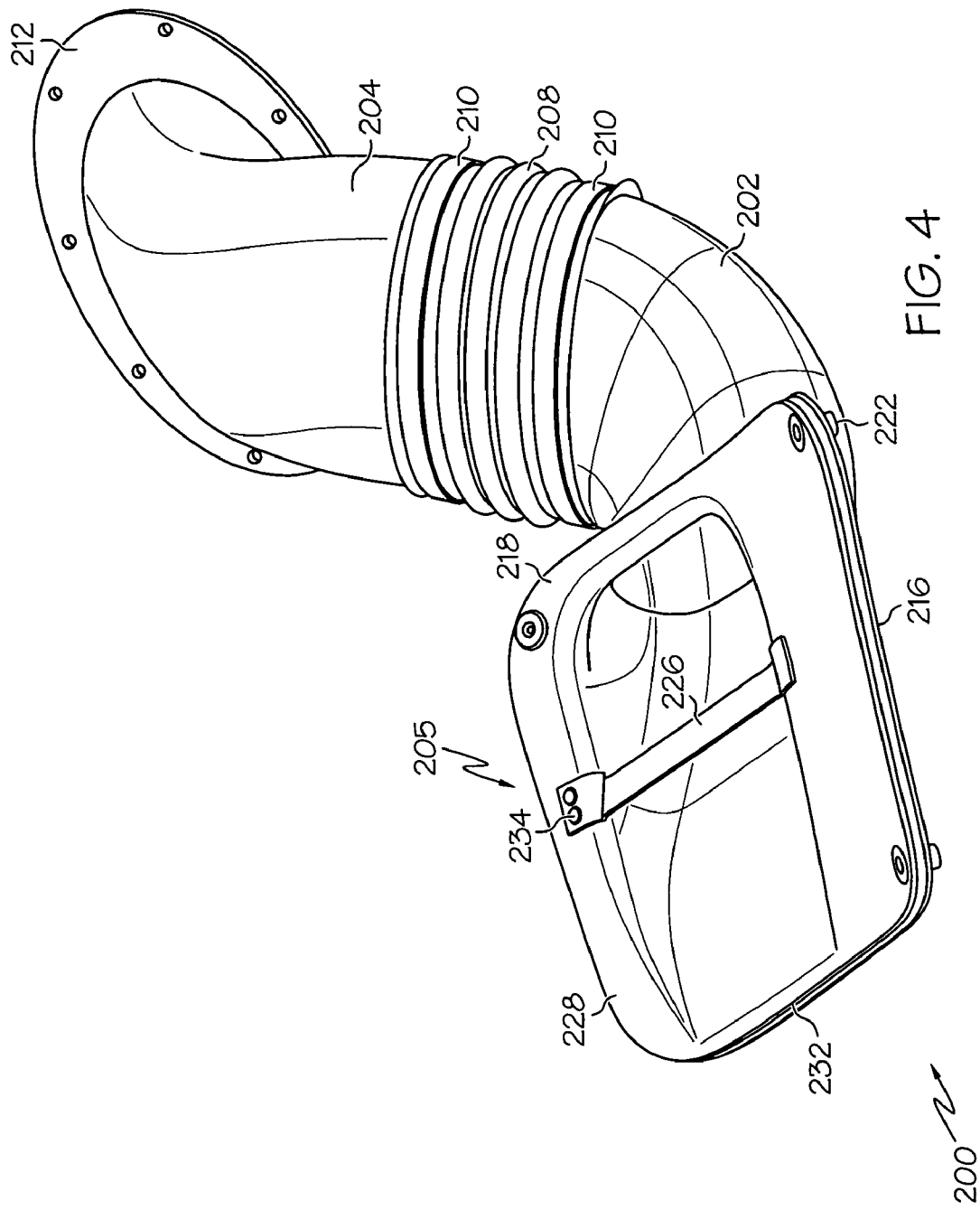
FIG. 4 is a simplified orthogonal view of the flush scoop inlet bleed air duct shown in FIG. 3.

As shown in FIGS. 3 and 4, the lower fan bleed air duct 202 includes a wall 201 that defines a flow passageway 203 in fluid communication with a bleed air duct flow passageway 134, and further includes an inlet section 205. The inlet section 205 is preferably configured as a flush scoop inlet well known in the art. More specifically, the lower fan bleed air duct 202 is configured in general having a flush scoop 216 and a scoop highlite 218 defined in the inlet section 205. The inlet section 205 forms a flush inlet where it joins with the engine outer fan duct 114 and a local bypass duct flow stream 220 (FIG. 3). The lower fan bleed air duct 202 is considered a "flush" inlet in that none of its surface protrudes into the local bypass duct flow stream 220. The lower fan bleed air duct 202 is further defined by a scoop throat 222 downstream from the inlet section 205. In the depicted embodiment, the inlet section 205 is contoured using any one of numerous known methods, to achieve the characteristics of a scoop shaped inlet. It will be appreciated that a scooped shaped inlet is merely exemplary of a flush inlet configuration and that numerous other flush inlet configurations could also be used. It will additionally be appreciated that configuring the inlet section 205 as a scoop shaped inlet is merely preferred, and that it could be otherwise configured. Moreover, a rounded shape is merely exemplary, and other shapes and geometries that provide the desired flow characteristics may also be used. To control a flow of bleed air 223 through the lower fan bleed air duct 202, a flow shut-off valve 224, generally similar to the fan air bleed valve 160 of FIG. 1, is positioned downstream and controlled by an associated control system.

Although the flush joining of the lower fan bleed air duct 202 with the fan bleed air duct flow passageway 134 helps to reduce associated resonance tones, in an attempt to completely eliminate any remaining resonance tones, a louver 226 is positioned flush with a top portion 228 of the inlet section 205 of the flush scoop 216. The louver 226 is preferably positioned at an angle "x" relative to neutral, or the local bypass duct flow stream 220, where "x" is between 15°-60°. In this preferred embodiment, the louver 226 is positioned at a 45° angle relative to neutral, or the local bypass duct flow stream 220. The louver 226 provides a disturbance in the flow of bleed air 223 (FIG. 3) into the lower fan bleed air duct 202 and produces a consistent low pressure region 230 downstream of the louver 226 and forward the scoop highlite 218.

The louver 226 is further configured to have an axial position between 25%-75% of the distance between a forward portion 232 of the flush scoop 216 and the scoop highlite 218. In the illustrated preferred embodiment, the louver 226 is configured having an axial position approximately 30% of the distance between the forward portion 232 of the flush scoop 216 and the scoop highlite 218.

The louver 226 is preferably formed of a high heat resistant metal such as stainless steel or aluminum. In a preferred embodiment, the louver 226 is formed as a separate component and fixed in place by a plurality of fasteners 234, such as a plurality of bolts. In an alternate embodiment, the louver 226 may be formed integral with the flush scoop 216. More specifically, the louver 226 may be molded during the fabrication of the flush scoop 216 and or the lower fan bleed air duct 202 and formed of an organic composite material, or the like. The configuration, shape, location, and various other parameters associated with the flush scoop 216, the lower fan bleed air duct 202 and the louver 226 included in the embodiment shown in FIGS. 3 and 4 may be similarly varied to meet a desired flow characteristic.

During operation, when the flow shut-off valve 224, disposed within the lower fan bleed air duct 202, is in a closed position, the flow disturbance that is created by the inclusion of the louver 226 substantially eliminates any Helmholtz resonance. More specifically, the flow disturbance causes the low pressure region 230 to occur aft of the louver 226, thereby continuously venting any high pressure region that may form in the lower fan bleed air duct 202, and thus relieving the pressure pulse characteristics of a Helmholtz resonance. The louver 226 is preferably angled into the flow of bleed air 223 streamline path such that during full scoop flow, when the flow shut-off valve 224 is in an open position, the flow loss from the louver 226 is minimized, and the scoop recovery is maximized. Furthermore, when the flow shut-off valve 224 is in an open position, the louver 226 minimizes inlet recovery loss.

Accordingly, described is flush inlet scoop design for aircraft bleed air system in which a flow disturbance is created by the inclusion of a louver 226 in an inlet portion 205 of a flush scoop 216. By creating the flow disturbance, a low pressure region 230 is created aft of the louver 226, thereby substantially eliminating the generation of any pressure pulses and acoustic resonance.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A flush inlet scoop duct for a bleed air system, comprising:
a duct having a wall that defines a flow passageway, and including at least a flush scoop in fluid communication with the flow passageway, the flush scoop coupled to a fan bypass duct to receive a fan bleed airflow from the fan bypass duct; and
a louver coupled to a flush scoop inlet and splitting the fan bleed airflow to the flush scoop inlet into two passages, the louver configured to create a low pressure region within the flow passageway, downstream of the louver.

2. A flush inlet scoop duct as claimed in claim 1, wherein the duct is a fan bleed air duct and includes an upper fan bleed air duct and a lower fan bleed air duct coupled to an aircraft pylon and configured to receive the fan bleed airflow.

3. A flush inlet scoop duct as claimed in claim 1, wherein the flush scoop includes an inlet section defined by a forward portion and a highlite and a scoop throat downstream of the inlet section.

4. A flush inlet scoop duct as claimed in claim 3, wherein the louver is configured having an axial position a value 'x' of a distance between the forward portion and the highlite of the inlet section, wherein 'x' is in a range of 25% to 75%.

5. A flush inlet scoop duct as claimed in claim 4, wherein the louver is configured having an axial position at 30% of the distance between the forward portion and the highlite of the inlet section, measured from the forward portion.

6. A flush inlet scoop duct as claimed in claim 3, wherein the louver is coupled to a top portion of the inlet section of the flush scoop with a plurality of fasteners.

7. A flush inlet scoop duct as claimed in claim 1, wherein the louver is integrally formed with the flush scoop.

8. A flush inlet scoop duct as claimed in claim 1, wherein the louver is configured at an angle 'x' relative to the local flow stream of fluid, where 'x' is in a range of 15°-60°.

9. A flush inlet scoop duct as claimed in claim 8, wherein the louver is configured at an angle 'x' relative to the local flow stream of fluid, where 'x' is 45°.

10. A bleed air duct system for a vehicle engine including a flush inlet scoop, the bleed air duct system comprising:
a fan bleed air duct having a wall that defines a flow passageway, the fan bleed air duct adapted to receive a flow of fluid from the vehicle engine;
an outer fan bleed air duct having a wall that defines a flow passageway, and including at least a flush scoop in fluid communication with the flow passageway of the outer fan bleed air duct, the flush scoop coupled to an outer wall of the fan bleed air duct; and
a louver coupled to the flush scoop and extending into the flow of fluid received from the fan bleed air duct, the louver configured to create a low pressure region within the flow passageway of the fan bleed air duct, downstream of the louver.

11. A bleed air duct system as claimed in claim 10, wherein the outer fan bleed air duct includes an upper fan bleed air duct and a lower fan bleed air duct coupled to an aircraft pylon and configured to receive the flow of fluid from the fan bleed air duct.

12. A bleed air duct system as claimed in claim 10, wherein the flush scoop includes an inlet section and a scoop throat, the inlet section defined by a forward portion and a highlite.

13. A bleed air duct system as claimed in claim 12, wherein the louver is configured having an axial position a value 'x' of a distance between the forward portion and the highlite of the inlet section, wherein 'x' is in a range of 25% to 75%.

14. A bleed air duct system as claimed in claim 13, wherein the louver is configured having an axial position at 30% of the distance between the forward portion and the highlite of the inlet section, measured from the forward portion.

15. A bleed air duct system as claimed in claim 10, wherein the louver is configured at an angle 'x' relative to the flow of fluid in the fan bleed air duct, where 'x' is in a range of 15°-60°.

16. A bleed air duct system as claimed in claim 15, wherein the louver is configured at an angle 'x' relative to the flow of fluid in the fan bleed air duct, where 'x' is 45°.

17. A turbine bleed air duct system comprising:
a gas turbine engine comprising:
an engine case having a bleed air supply plenum disposed therein,
an intake section, a compressor section a combustion section and a turbine section all mounted in flow series within the engine case;
a fan bleed air duct having a wall that defines a flow passageway, the fan bleed air duct adapted to receive a flow of fluid from the intake section; and
an outer fan bleed air duct having a wall that defines a flow passageway, and including at least a flush scoop in fluid communication with the flow passageway of the outer fan bleed air duct, the flush scoop including an inlet section and a scoop throat, the inlet section defined by a forward portion and a highlite, the flush scoop coupled to an outer wall of the fan bleed air duct; and
a louver coupled to the flush scoop and extending into the flow of fluid received from the fan bleed air duct, the louver configured to create a low pressure region within the flow passageway of the fan bleed air duct, downstream of the louver.

18. A turbine bleed air duct system as claimed in claim 17, wherein the louver is configured having an axial position a value 'x' of a distance between the forward portion and the highlite of the inlet section, wherein 'x' is in a range of 25% to 75%.

19. A turbine bleed air duct system as claimed in claim 17, wherein the louver is configured at an angle 'x' relative to the flow of fluid in the fan bleed air duct, where 'x' is in a range of 15°-60°.

20. A turbine bleed air duct system as claimed in claim 19, wherein the louver is configured at an angle 'x' relative to the flow of fluid in the fan bleed air duct, where 'x' is 45°.

* * * * *